(No Model.)
W. FRISHMUTH.
GALVANIC CELL.
No. 358,031. Patented Feb. 22, 1887.
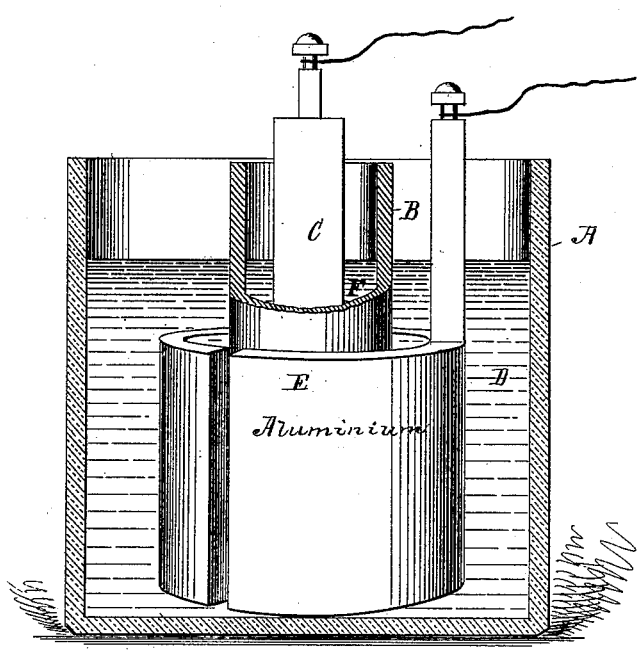

UNITED STATES PATENT OFFICE.

WILLIAM FRISHMUTH, OF PHILADELPHIA, PENNSYLVANIA, ASSIGNOR, BY DIRECT AND MESNE ASSIGNMENTS, TO RUDOLPHE DE MONTGELAS, WILLIAM H. GAW, J. HINCKLEY CLARK, RUDOLPH ELLIS, HENRY JUNGERICH, AND GEORGE C. POTTS, ALL OF SAME PLACE.

GALVANIC CELL.

SPECIFICATION forming part of Letters Patent No. 358,031, dated February 22, 1887.

Application filed October 20, 1886. Serial No. 216,716. (No model.)

*To all whom it may concern:*

Be it known that I, WILLIAM FRISHMUTH, of the city and county of Philadelphia, Pennsylvania, have invented a new and useful Improvement in Galvanic Cells, of which the following is a specification.

My invention consists in a galvanic cell containing a negative electrode of aluminium. By "negative electrode" I mean the electrode toward which the current apparently flows in the cell.

The accompanying drawing is an elevation and partial section of a cell illustrative of my invention.

It is well known that the non-attackable element in galvanic cells is ordinarily made of copper, carbon, or platinum, but more commonly of carbon. The main objections to copper are its cost, ready polarization, corrosion, and proximity to the usual attacked element, zinc, on the electro-motive scale. The high cost of platinum prevents its use. Carbon, although it is a cheap substance and one far separated from zinc on the electro-motive scale, nevertheless is open to many objections. Being porous, it is liable to become clogged with salts and other impurities. It offers a variable resistance, depending upon its composition and homogeneity. It is apt to crumble and disintegrate. To attach connections to it is a difficult matter. If used in large slabs, it causes useless addition to the weight of the cell; if thin, brittleness and easy breakage follow. It is expensive to mold in special shapes, such as tubes, &c.

I have found that an element of aluminium replacing the carbon element in any cell where the same is used gives advantages which are not gained by an element of any other material. The metal, as is well known, is exceedingly light and strong. It is substantially inoxidizable, and hence far separated from zinc on the electro-motive scale. It may be cast or molded in any desired form with great ease. An element made from it may be a thin plate, exceedingly light and thin. It is one of the best of electrical conductors. It is always, when produced in a pure state, of uniform and homogeneous composition. It is now possible to obtain it from alumina very cheaply. It is virtually unalterable in the ordinary electrolytic liquids employed in cells. It combines, in brief, all the advantages of platinum and of carbon with the disadvantages of neither, while it adds its own valuable peculiarities of great lightness, strength, ease of manipulation, and electrical conductibility.

In the annexed drawing I show an ordinary form of galvanic cell, in which the usual carbon electrode is replaced by one of aluminium. A is the containing vessel; B, the porous cup in which is placed a zinc element, C, and an exciting fluid, F. E is the aluminium element immersed in a depolarizing fluid, D.

I claim as my invention—

1. In a galvanic cell, a negative electrode of aluminium, substantially as described.

2. In a galvanic cell, elements respectively of zinc and aluminium, substantially as described.

WILLIAM FRISHMUTH.

Witnesses:
R. DE MONTGELAS,
W. H. GAW.